United States Patent [19]

Trotter et al.

[11] Patent Number: 4,487,919
[45] Date of Patent: Dec. 11, 1984

[54] POLYESTER WAXES BASED ON 1,12-DODECANEDIOIC ACID

[75] Inventors: Jimmy R. Trotter; Frederick B. Joyner; Richard L. McConnell, all of Kingsport, Tenn.

[73] Assignee: Eastman Kodak Company, Rochester, N.Y.

[21] Appl. No.: 509,559

[22] Filed: Jun. 30, 1983

[51] Int. Cl.$^3$ ............................................. C08G 63/02
[52] U.S. Cl. .................. 528/272; 260/410.6; 528/308.7; 560/193; 560/198
[58] Field of Search ............................ 528/272, 308.7; 560/193, 198; 260/410.6

[56] References Cited

U.S. PATENT DOCUMENTS 4,248,996  2/1981  Sterzel et al. ..................... 528/272

*Primary Examiner*—Lucille M. Phynes
*Attorney, Agent, or Firm*—Clyde L. Tootle; Daniel B. Reece, III

[57] ABSTRACT

This invention relates to new linear polyester waxes which contain as the acid member at least about 75 mol percent 1,12-dodecanedioic acid. The polyester waxes may be viscous liquids, amorphous or semicrystalline solids with melting points less than about 100° C. These polyester waxes are useful as modifiers for ethylene/vinyl acetate copolymer based adhesives and as additives to improve the hardness of polyolefin coatings.

24 Claims, No Drawings

POLYESTER WAXES BASED ON 1,12-DODECANEDIOIC ACID

DESCRIPTION

Polyester Waxes Based on 1,12-Dodecanedioic Acid

This invention relates to new linear polyester waxes which contain as the acid member at least about 75 mole percent 1,12-dodecanedioic acid. The polyester waxes are viscous liquids, amorphous or semicrystalline solids with melting points less than about 100° C. These polyester waxes are useful as wax modifiers for ethylene/vinyl acetate copolymer based adhesives and as additives to improve the hardness of polyolefin coatings.

Heretofore, naturally occurring waxes have been used for a very long time in industry. For example, petroleum waxes (paraffin, microcrystalline wax), animal waxes (beeswax, spermaceti, and lanolin), mineral waxes (montan and ozokerite), and vegetable waxes (bayberry, carnauba, Japan, candelilla, ouricury, and rice bran) are commonly used in such applications as candles, cosmetics, inks, carbon paper, crayons, rubber products, and lubricants. However, these naturally occurring waxes are in limited supply and are not always available, and when they are available they can be expensive. Also, they are very low in molecular weight and have melt viscosities of less than about 25 centipoise at 190° C., which are not desirable for some applications.

According to the present invention, it has now been found that new and useful polyester waxes with narrow molecular weight distributions and with melting points less than about 100° C. can readily be prepared. This broad range of melting points is not available from conventional waxes. It is also possible to vary the molecular weight of these waxes and to provide waxes with different rheological characteristics. Thus, polymers, with wax-like properties can be prepared which have inherent viscosities in the range from about 0.05 to about 0.39, a melt viscosity of from about 10 to about 2000, preferably about 15 to about 1000, most preferably about 20 to 750 cp. at 190° C., a heat of fusion of less than 40 cal./g. These new waxes are useful as modifiers for ethylene/vinyl acetate copolymer based adhesives and as additives to improve the hardness of polyolefin coatings.

These new polyester waxes may contain crystallizable moieties with crystalline melting points less than 100° C. They contain as the acid member at least 75 mol percent 1,2-dodecanedioic acid. The remaining acid member may be a $C_4$ to $C_{10}$ dibasic aliphatic acid such as, for example, adipic, succinic, glutaric and sebacic acid. The polyesters of this invention also contain one or more selected aliphatic or cycloaliphatic glycols. Useful glycols include ethylene glycol, 1,3-propanediol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, poly-(oxyethylene)glycol, and the like These new polyester and copolyester waxes are readily prepared using typical polycondensation reaction conditions. They may be prepared either by batch or continuous processes based on esterification or transesterification reactions well known in the art.

Typical polyesterification catalysts which may be used include titanium alkoxides, dibutyltin dilaurate, and combinations of zinc, manganese, or magnesium acetates or benzoates with antimony oxides or antimony triacetate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 115 grams (0.5 moles) of 1,12-dodecanedioic acid, 62 grams (1.0 mole) of ethylene glycol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 210° C. in a Belmont metal bath for four hours with a nitrogen sweep over the reaction mixture. When the theoretical amount of water has distilled from the reaction mixture, the metal bath temperature is increased to 275° C. and the pressure in the flask is reduced to about 0.1 mm of mercury. The flask is heated at 275° C. at reduced pressure for 4 minutes. The flask is then removed from the metal bath and is allowed to cool under a nitrogen atmosphere as the polymer solidifies.

The poly(ethylene dodecanedioate) is an opaque, white color. The polymer has a number average molecular weight ($M_n$) of 5122, a Thermosel melt viscosity of 555 cp. at 190° C., and a penetration hardness value of $\leq 1$ (by ASTM D5 method). By DSC analysis, the polymer has a melting point ($T_m$) of 86° C. [heat of fusion ($\Delta H_f$) value of 24.3 cal./g.].

When melt blended at 177° C. at the 10 wt. percent level with various waxes and resins, the polyester wax is compatible in the melt with Epolene C-10 low molecular weight polyethylene and with Elvax 220 EVA copolymer.

A melt blend is made at 175° C. in a glass flask using 35 g of Elvax 220 copolymer (ethylene/vinyl acetate copolymer containing 28 wt. percent vinyl acetate; melt index 150), 30 g of Foral 105 rosin ester tackifying resin (ring and ball softening point 105° C.), 25 g of 150° F. microcrystalline wax, and 10 g of poly(ethylene dodecanedioate) wax. A ⅛-inch molten bead of this blend is applied at 175° C. to a piece of corrugated board and this piece of corrugated board is quickly laminated to another piece of corrugated board. A fiber tearing bond is obtained with this adhesive mixture in about two seconds compression time.

A melt blend is made at 175° C. in a glass flask using 30 g of Elvax 220 copolymer, 10 g of Foral 105 rosin ester tackifying resin, 70 g of paraffin wax ($T_m$ 60° C.), and 10 g of poly(ethylene dodecanedioate) wax. This blend is readily melt coated onto kraft paper at 120° C. using a hot doctor blade to provide a hard and glossy 1 mil coating. The coating is not easily scratched with a fingernail and is readily heat sealed in a Sentinel heat sealer using a jaw temperature of 150° C. and compression time of 0.2 sec.

EXAMPLE 2

About 115 grams (0.5 moles) of 1,12-dodecanedioic acid, 90 grams (1.0 mole) of 1,4-butanediol, and 100 ppm of titanium catalyst (titanium isopropoxide in n-butanol) are weighed into a 500 mL single-neck round-bottom flask equipped with a nitrogen inlet, a stirrer, a vacuum outlet, and a condensing flask. The flask is heated to 200°–210° C. in a Belmont metal bath for two hours with a nitrogen sweep over the reaction mixture. When the theoretical amount of water has distilled from the reaction mixture, the metal bath temperature is increased to 250° C. and the pressure in the flask is reduced to about 0.1 mm of mercury. The flask is heated at 250° C. at reduced pressure for 4 minutes. The flask is then removed from the metal bath and is allowed to cool under a nitrogen atmosphere as the polymer solidifies.

The poly(butylene dodecanedioate) is an opaque, white color. The polymer has a Thermosel melt viscosity of 20 cp. at 190° C., and a penetration hardness value of 4 (by ASTM D5 method). By DSC analysis, the polymer has a melting point ($T_m$) of 69° C. [heat of fusion ($\Delta H_f$) value of 18.1 cal./g.].

When melt blended at 177° C. at the 10 wt. percent level, the polyester wax is compatible in the melt with Epolene C-10 low molecular weight polyethylene and with Elvax 220 EVA copolymer.

EXAMPLE 3

About 115 grams (0.5 moles) of 1,12-dodecanedioic acid, 118 grams (1.0 mole) of 1,6-hexanediol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 210° C. in a Belmont metal bath for four hours with a nitrogen sweep over the reaction mixture. When the theoretical amount of water has distilled from the reaction mixture, the metal bath temperature is increased to 260° C. and the pressure in the flask is reduced to about 0.1 mm of mercury. The flask is heated at 260° C. at reduced pressure for 4 minutes. The flask is then removed from the metal bath and is allowed to cool under a nitrogen atmosphere as the polymer solidifies.

The poly(hexamethylene dodecanedioate) is an opaque, white color. The polymer has a Thermosel melt viscosity of 175 cp. at 190° C., and a penetration hardness value of 3 (by ASTM D5 method). By DSC analysis, the polymer has a melting point ($T_m$) of 60° [heat of fusion ($\Delta H_f$) value of 11.1 cal./g.].

EXAMPLE 4

About 115 grams (0.5 moles) of 1,12-dodecanedioic acid, 144 grams (1.0 mole) of 1,4-cyclohexanedimethanol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 240° C. in a Belmont metal bath for four hours with a nitrogen sweep over the reaction mixture. When the theoretical amount of water has distilled from the reaction mixture, the metal bath temperature is increased to 285° C. and the pressure in the flask is reduced to about 0.1 mm of mercury. The flask is heated at 285° C. at reduced pressure for 4 minutes. The flask is then removed from the metal bath and is allowed to cool under a nitrogen atmosphere as the polymer solidifies.

The poly(1,4-cyclohexylenedimethylene dodecanedioate) is an opaque, white color. The polymer has a Thermosel melt viscosity of 44 cp. at 125° C. By DSC analysis, the polymer has a melting point ($T_m$) of 67° C. [heat of fusion ($\Delta H_f$) value of 32.1 cal./g.].

EXAMPLE 5

About 115 grams (0.5 moles) of 1,12-dodecanedioic acid, 67.6 grams (0.65 mole) of neopentyl glycol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 220° C. in a Belmont metal bath for two hours with a nitrogen sweep over the reaction mixture. When the theoretical amount of water has distilled from the reaction mixture, the metal bath temperature is increased to 250° C. and the pressure in the flask is reduced to about 0.1 mm of mercury. The flask is heated at 250° C. at reduced pressure for 10 minutes. The flask is then removed from the metal bath and is allowed to cool under a nitrogen atmosphere as the polymer cools.

The poly(2,2-dimethyltrimethylene dodecanedioate) is an opaque, white viscous liquid.

When melt blended at 177° C. at the 10 wt. percent level, the polyester wax is compatible in the melt with Epolene C-10 low molecular weight polyethylene, carnauba wax and with Elvax 220 EVA copolymer.

EXAMPLE 6

About 24.25 grams (0.125 mole) of dimethyl terephthalate, 86.25 grams (0.375 mole) of 1,12-dodecanedioic acid, 67.5 grams (0.75 mole) of 1,4-butanediol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200° C. in a Belmont metal bath for one hour with a nitrogen sweep over the reaction mixture. The temperature of the metal bath is then increased to 210° C. for one hour. When the theoretical amount of methanol and water has distilled from the reaction mixture, the metal bath temperature is increased to 250° C. and the pressure in the flask is reduced to about 0.1 mm of mercury. The flask is heated at 250° C. at reduced pressure for 12 minutes. The flask is then removed from the metal bath and is allowed to cool under a nitrogen atmosphere as the polymer solidifies. NMR analysis indicates that the polymer is a poly(butylene dodecanedioate) copolyester containing 20 mole percent terephthalic acid moiety.

The polyester wax is an opaque, cream color. The wax has a Thermosel melt viscosity of 700 cp. at 190° C., and a penetration hardness value of 2 (by ASTM D5 method). By DSC analysis, the wax has a melting point ($T_m$) of 59° C. [heat of fusion ($\Delta H_f$) value of 16.1 cal./g.].

When melt blended at 177° C. at the 10 wt. percent level, this copolyester wax is incompatible in the melt with both low molecular weight polyethylene wax and with ethylene/vinyl acetate copolymer.

This example shows that copolyester waxes containing an aromatic moiety are not compatible with waxes such as ethylene containing waxes.

EXAMPLE 7

About 115 grams (0.5 mole) of 1,12-dodecanedioic acid, 82.8 grams (0.92 mole) of 1,4-butanediol, 9.44 grams (0.08 mole) of 1,6-hexanediol, and 100 ppm of titanium catalyst (titanium isopropoxide in n-butanol) are placed into a 500-mL single-neck, round bottom flask equipped with a nitrogen inlet, a stirrer, a vacuum outlet, and a condensing flask. The flask is heated to 200° C. in a metal bath for one hour with a nitrogen sweep over the reaction mixture. Then the temperature of the metal bath is increased to 210° C. for one hour. When the theoretical amount of water has distilled from the reaction mixture, the metal bath temperature is increased to 250° C. and the pressure in the flask is reduced to about 0.1 mm of mercury. The flask is heated at 250° C. at reduced pressure for 15 minutes. The flask is then removed from the bath and is allowed to cool under a nitrogen atmosphere as the polymer solidifies. By NMR analysis the polymer is a poly(butylene dodecanedioate) copolyester containing 10 mol percent of the 1,6-hexanediol moiety. The polymer has an I.V. of 0.27. By DSC analysis, the polymer has a melting point of 51° C. [heat of fusion ($\Delta H_f$) is 10.5 cal./g.].

EXAMPLE 8

About 109.25 grams (0.475 mole) of 1,12-dodecanedioic acid, 4.35 grams (0.025 mole) of dimethyl adipate, 62 grams (1.0 mole) of ethylene glycol, and 100 ppm of titanium catalyst (titanium isopropoxide in n-butanol) are placed into a 500-ml single-neck, round bottom flask equipped with a nitrogen inlet, a stirrer, a vacuum outlet, and a condensing flask. The flask is heated to 200° C. in a metal bath for one hour with a nitrogen sweep over the reaction mixture. Then the temperature of the metal bath is increased to 210° C. for one hour. When the theoretical amount of water and methanol is distilled from the reaction mixture, the metal bath temperature is increased to 250° C. and the pressure in the flask is reduced to about 0.1 mm of mercury. The flask is heated at 250° C. at reduced pressure for 10 minutes. The flask is then removed from the bath and is allowed to cool under a nitrogen atmosphere as the polymer solidifies. By NMR analysis the polymer is a poly(ethylene dodecanedioate) containing 5 mol percent of adipic acid moiety. The polymer has an I.V. of 0.18. By DSC analysis, the polymer has a melting point of 76° C. [heat of fusion ($\Delta H_f$) is 16.5 cal./g.].

EXAMPLE 9

About 86.25 grams (0.375 mole) of 1,12-dodecanedioic acid, 25.25 grams (0.125 mole) of sebacic acid, 62 grams (1.0 mole) of ethylene glycol, and 100 ppm of titanium catalyst (titanium isopropoxide in n-butanol) are placed into a 500-ml single-neck, round bottom flask equipped with a nitrogen inlet, a stirrer, a vacuum outlet, and a condensing flask. The flask is heated to 200° C. in a metal bath for one hour with a nitrogen sweep over the reaction mixture. Then the temperature of the metal bath is increased to 210° C. for one hour. When the theoretical amount of water is distilled from the reaction mixture, the metal bath temperature is increased to 250° C. and the pressure in the flask is reduced to about 0.1 mm of mercury. The flask is heated at 250° C. at reduced pressure for 15 minutes. The flask is then removed from the bath and is allowed to cool under a nitrogen atmosphere as the polymer solidifies. By NMR analysis the polymer is a poly(ethylene dodecanedioate) containing 25 mol percent of sebacic acid moiety. The polymer has an I.V. of 0.31. By DSC analysis, the polymer has a melting point of 47° C. [heat of fusion ($\Delta H_f$) is 6.1 cal./g.].

The polyester waxes of this invention when blended with polyolefins provide coating compositions for coating the substrates such as kraft paper, milk carton stock, photographic papers, cellulosic sheets, primed metal foils such as aluminum and the like. These polyester waxes can also be blended with ethylene/vinyl acetate copolymers to form adhesives. The coated substrates and adhesives find utility in food packaging, drug and medicine packing and other well known uses.

The invention has been described in detail with particular reference to preferred embodiments thereof, but it will be understood that variations and modifications can be effected within the spirit and scope of the invention.

We claim:

1. A linear polyester wax composition having a melting point less than about 100° C. and a melt viscosity of about 10 cp. to about 2000 cp. at 190° C., a heat fusion of less than 40 cal./g. containing as the acid member at least about 75 mole percent 1,12-dodecanedioic acid, and the acid functioning derivatives thereof, and linear aliphatic and cycloaliphatic glycols having 2 to 10 carbon atoms as the diol member.

2. A linear polyester wax composition according to claim 1 wherein said aliphatic glycol is ethylene glycol.

3. A linear polyester wax composition according to claim 1 wherein said aliphatic glycol is diethylene glycol.

4. A linear polyester wax composition according to claim 1 wherein said aliphatic glycol is 1,4-butanediol.

5. A linear polyester wax composition according to claim 1 wherein said cycloaliphatic glycol is 1,4-cyclohexane dimethanol.

6. A linear polyester wax composition according to claim 1 wherein said aliphatic glycol is 1,6-hexanediol.

7. A linear polyester wax composition according to claim 1 wherein said aliphatic glycol is a mixture of ethylene glycol and diethylene glycol.

8. A linear polyester wax composition according to claim 1 wherein said aliphatic glycol is a mixture of 1,4-butanediol and 1,6-hexanediol.

9. A linear polyester wax composition having a melting point less than about 100° C. and a melt viscosity of about 15 cp. to about 1000 cp. at 190° C., a heat fusion of less than 40 cal./g. containing as the acid member at least about 75 mole percent 1,12-dodecanedioic acid, and the acid functioning derivatives thereof, and linear aliphatic and cycloaliphatic glycols having 2 to 10 carbon atoms as the diol member.

10. A linear polyester wax composition according to claim 9 wherein said aliphatic glycol is ethylene glycol.

11. A linear polyester wax composition according to claim 9 wherein said aliphatic glycol is diethylene glycol.

12. A linear polyester wax composition according to claim 9 wherein said aliphatic glycol is 1,4-butanediol.

13. A linear polyester wax composition according to claim 9 wherein said cycloaliphatic glycol is 1,4-cyclohexane dimethanol.

14. A linear polyester wax composition according to claim 9 wherein said aliphatic glycol is 1,6-hexanediol.

15. A linear polyester wax composition according to claim 9 wherein said aliphatic glycol is a mixture of ethylene glycol and diethylene glycol.

16. A linear polyester wax composition according to claim 9 wherein said aliphatic glycol is a mixture of 1,4-butanediol and 1,6-hexanediol.

17. A linear polyester wax composition having a melting point less than about 100° C. and a melt viscosity of about 20 cp. to about 750 cp. at 190° C., a heat fusion of less than 40 cal./g. containing as the acid member at least about 75 mole percent 1,12-dodecanedioic acid, and the acid functioning derivatives thereof, and linear aliphatic and cycloaliphatic glycols having 2 to 10 carbon atoms as the diol member.

18. A linear polyester wax composition according to claim 17 wherein said aliphatic glycol is ethylene glycol.

19. A linear polyester wax composition according to claim 17 wherein said aliphatic glycol is diethylene glycol.

20. A linear polyester wax composition according to claim 17 wherein said aliphatic glycol is 1,4-butanediol.

21. A linear polyester wax composition according to claim 17 wherein said cycloaliphatic glycol is 1,4-cyclohexane dimethanol.

22. A linear polyester wax composition according to claim 17 wherein said aliphatic glycol is 1,6-hexanediol.

23. A linear polyester wax composition according to claim 17 wherein said aliphatic glycol is a mixture of ethylene glycol and diethylene glycol.

24. A linear polyester wax composition according to claim 17 wherein said aliphatic glycol is a mixture of 1,4-butanediol and 1,6-hexanediol.

* * * * *